US012736373B2

(12) United States Patent
Nagatomo et al.

(10) Patent No.: US 12,736,373 B2
(45) Date of Patent: Sep. 15, 2026

(54) GAS METER

(71) Applicant: Panasonic Intellectual Property Management Co., Ltd., Osaka (JP)

(72) Inventors: Kenji Nagatomo, Kyoto (JP); Mitsuo Yokohata, Osaka (JP); Mitsunobu Enomoto, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 242 days.

(21) Appl. No.: 18/578,988

(22) PCT Filed: Jul. 11, 2022

(86) PCT No.: PCT/JP2022/027253
§ 371 (c)(1),
(2) Date: Jan. 12, 2024

(87) PCT Pub. No.: WO2023/286734
PCT Pub. Date: Jan. 19, 2023

(65) Prior Publication Data
US 2024/0318981 A1 Sep. 26, 2024

(30) Foreign Application Priority Data
Jul. 16, 2021 (JP) ................................ 2021-117520

(51) Int. Cl.
*G01D 4/00* (2006.01)
*G01F 3/22* (2006.01)
(Continued)

(52) U.S. Cl.
CPC ......... *G01D 4/002* (2013.01); *G01D 2204/22* (2021.05); *G01F 3/22* (2013.01);
(Continued)

(58) Field of Classification Search
CPC .. G01D 4/002; G01D 2204/22; G01F 15/024; G01F 15/063; G01F 15/0755; G01F 3/22; G01F 15/046
(Continued)

(56) References Cited

U.S. PATENT DOCUMENTS

2011/0000310 A1 1/2011 Yokohata et al.
2013/0340859 A1* 12/2013 Downie ................ G01F 15/063 137/486
(Continued)

FOREIGN PATENT DOCUMENTS

JP 3-3428 1/1991
JP 9-180084 7/1997
(Continued)

OTHER PUBLICATIONS

International Search Report issued Aug. 9, 2022 in corresponding International Application No. PCT/JP2022/027253.
(Continued)

*Primary Examiner* — Peter J Macchiarolo
*Assistant Examiner* — John M Royston
(74) *Attorney, Agent, or Firm* — Wenderoth, Lind & Ponack, L.L.P.

(57) ABSTRACT

A flow rate measuring member configured to measure a flow rate of a gas, a storage configured to store a plurality of pieces of predetermined data, except for a meter read value, of a plurality of pieces of data each of which is calculated based on the flow rate measured by the flow rate measuring member, and a communicator configured to transmit the plurality of pieces of predetermined data stored in the storage to an external device are provided. The storage starts sequentially storing the plurality of pieces of predetermined data in response to an occurrence of a predetermined event, and the communicator transmits, at a predetermined timing,
(Continued)

the plurality of pieces of predetermined data stored in the storage to the external device.

1 Claim, 7 Drawing Sheets

(51) Int. Cl.
*G01F 15/02* (2006.01)
*G01F 15/04* (2006.01)
*G01F 15/063* (2022.01)
*G01F 15/075* (2006.01)

(52) U.S. Cl.
CPC .......... *G01F 15/024* (2013.01); *G01F 15/046* (2013.01); *G01F 15/063* (2013.01); *G01F 15/0755* (2013.01)

(58) Field of Classification Search
USPC .................................... 73/861, 272 R, 272 A
See application file for complete search history.

(56) References Cited

U.S. PATENT DOCUMENTS

| | | | | |
|---|---|---|---|---|
| 2020/0116541 | A1 | 4/2020 | Shirasawa et al. | |
| 2020/0182674 | A1 | 6/2020 | Murabayashi et al. | |
| 2021/0405597 | A1* | 12/2021 | Kimura | G05B 15/02 |

FOREIGN PATENT DOCUMENTS

| | | |
|---|---|---|
| JP | 2003-58975 | 2/2003 |
| JP | 2003-315134 | 11/2003 |
| JP | 2006-200800 | 8/2006 |
| JP | 2007-24811 | 2/2007 |
| JP | 2019-2853 | 1/2019 |
| JP | 2019-7637 | 1/2019 |

OTHER PUBLICATIONS

Extended European Search Report issued Oct. 8, 2024 in corresponding European Patent Application No. 22842078.2.

Notice of Reasons for Refusal issued Apr. 7, 2026 in corresponding Japanese Application No. 2025-113277 (with English translation).

* cited by examiner

10
FLOW RATE MEASURING MEMBER
11
ABNORMALITY DETERMINER
12
SENSOR MEMBER
VIBRATION SENSOR
TEMPERATURE SENSOR
PRESSURE SENSOR
13
INTEGRATOR
15
CONTROLLER
17
INTERRUPTER
16
10 GAS METER
EXTERNAL DEVICE
20
COMMUNICATOR
18
STORAGE
14
CONDITION SETTING MEMBER
TYPE OF STORAGE TARGET DATA
EVENT, MEASUREMENT CONDITION
TRANSMISSION TIMING
19

| START EVENT | TYPE OF DATA | STORAGE CONDITION | TRANSMISSION TIMING | END CONDITION |
|---|---|---|---|---|
| A1 : COMPLETION OF INSTALLATION | B1 : FLOW RATE | C1 : ONE-HOUR CYCLE | D1 : ONCE A DAY (0:00 A.M.) | E1 : COMMUNICATION |
| A2 : STATUS OF USE OF GAS | B2 : TIME OF DAY | C2 : ONE-MINUTE CYCLE | D2 : TIMING AT WHICH STORAGE MEMORY IS EXCEEDED | E2 : TIME PERIOD |
| A3 : OCCURRENCE OF EARTHQUAKE | B3 : PRESSURE VALUE | C3 : FLOW RATE VALUE | D3 : THE NUMBER OF PIECES OF DATA | E3 : THRESHOLD |
| A4 : PRESSURE DECREASE | B4 : EARTHQUAKE INTENSITY | C4 : DIFFERENCE VALUE | D4 : SPECIFIC CONDITION | – |
| A5 : COMMUNICATION | – | – | – | – |

(b)

| DETAILED DATA OF "B1 : FLOW RATE" |
|---|
| B1-1 : MINUS FLOW RATE |
| B1-2 : SECTION FLOW RATE |

*FIG. 5*

| FLOW RATE SECTION | GAS FLOW ( kg/h ) | CONTINUOUS USE TIME ( MINUTE ) |
|---|---|---|
| 1 | LESS THAN 0.042 | 300 |
| 2—1 | GREATER THAN OR EQUAL TO 0.042 AND LESS THAN 0126 | 240 |
| 2—2 | GREATER THAN OR EQUAL TO 0.126 AND LESS THAN 0.25 | 160 |
| 2—3 | GREATER THAN OR EQUAL TO 0.125 AND LESS THAN 0.42 | 160 |
| 3 | GREATER THAN OR EQUAL TO 0.42 AND LESS THAN 0.50 | 160 |
| 4 | GREATER THAN OR EQUAL TO 0.50 AND LESS THAN 0.58 | 160 |
| ⋮ | ⋮ | ⋮ |
| 9 | GREATER THAN OR EQUAL TO 1.42 AND LESS THAN 1.71 | 70 |
| 10 | GREATER THAN OR EQUAL TO 1.71 AND LESS THAN 2.00 | 60 |
| 11 | GREATER THAN OR EQUAL TO 2.00 AND LESS THAN 2.33 | 50 |
| 12 | GREATER THAN OR EQUAL TO 2.33 AND LESS THAN 2.92 | 40 |
| 13 | GREATER THAN OR EQUAL TO 2.92 AND LESS THAN 6.80 | 40 |

FIG. 6

| TIME ZONE | GAS CONSUMPTION | ESTIMATED USED APPLIANCE | INTEGRATED VALUE OF SECTIONS 2 TO 3 | INTEGRATED VALUE OF SECTIONS 10 TO 13 |
|---|---|---|---|---|
| 0 | 0 | | 0 | 0 |
| 1 | 50 | DRYER | 50 | 0 |
| 2 | 40 | DRYER | 40 | 0 |
| 3 | 10 | DRYER | 10 | 0 |
| 4 | 0 | | 0 | 0 |
| 5 | 0 | | 0 | 0 |
| 6 | 200 | STOVE, HOT WATER DISPENSER | 50 | 150 |
| 7 | 15 | | 15 | 0 |
| 8 | 0 | | 0 | 0 |
| 9 | 0 | | 0 | 0 |
| 10 | 0 | | 0 | 0 |
| 11 | 150 | STOVE | 0 | 0 |
| 12 | 30 | STOVE | 0 | 0 |
| 13 | 0 | | 0 | 0 |
| 14 | 0 | | 0 | 0 |
| 15 | 0 | | 0 | 0 |
| 16 | 0 | | 0 | 0 |
| 17 | 0 | | 0 | 0 |
| 18 | 400 | STOVE, HOT WATER DISPENSER | 100 | 300 |
| 19 | 150 | HOT WATER DISPENSER | 0 | 150 |
| 20 | 0 | | 0 | 0 |
| 21 | 0 | | 0 | 0 |
| 22 | 0 | | 0 | 0 |
| 23 | 0 | | 0 | 0 |

GAS METER

CROSS-REFERENCE TO RELATED APPLICATIONS

The present application is the U.S. National Phase under 35 U.S.C. § 371 of International Application No. PCT/JP2022/027253, filed on Jul. 11, 2022, which claims the benefit of priority of Japanese Patent Application No. 2021-117520, filed on Jul. 16, 2021, the entire contents of which are incorporated herein by reference.

TECHNICAL FIELD

The present disclosure relates to a gas meter having a function of storing a plurality of pieces of predetermined data obtained at regular intervals by the gas meter and collectively transmitting the plurality of pieces of predetermined data.

BACKGROUND ART

Patent Literature 1 discloses a gas meter having a basic function as the gas meter and a load survey function for each of gas appliances. The basic function is a function of integrating flow rates of a gas (acquiring meter read values). The load survey function is a function of sequentially storing consumption of the gas at regular time intervals and transmitting data thus stored to a management device via a telephone network or the like.

CITATION LIST

Patent Literature

Patent Literature 1: JP H 09-180084 A

SUMMARY OF INVENTION

The present disclosure provides a gas meter which enables an occurrence of an abnormality or a cause of the abnormality to be determined by using a load survey function.

A gas meter of the present disclosure includes a flow rate measuring member configured to measure a flow rate of a gas, a storage configured to store a plurality of pieces of predetermined data, except for a meter read value, of a plurality of pieces of data each of which is calculated based on the flow rate measured by the flow rate measuring member, a condition setting member configured to set a type of, and a storage condition for, the predetermined data to be stored in the storage, and a communicator for transmitting the plurality of pieces of predetermined data stored in the storage to an external device. The storage starts sequentially storing the plurality of pieces of predetermined data in response to an occurrence of a predetermined event set by the condition setting member, and the communicator transmits, at a predetermined timing set by the condition setting member, the plurality of pieces of predetermined data stored in the storage to the external device.

Moreover, a gas meter of the present disclosure includes a flow rate measuring member configured to measure a flow rate of a gas, a sensor member including a sensor configured to measure at least one of vibration, temperature, or pressure, a storage configured to store a plurality of pieces of predetermined data of a plurality of pieces of data measured by the sensor member, a condition setting member configured to set a type of, and a storage condition for, the predetermined data to be stored in the storage, and a communicator configured to transmit the plurality of pieces of predetermined data stored in the storage to an external device. The storage starts sequentially storing the plurality of pieces of predetermined data in response to an occurrence of a predetermined event set by the condition setting member, and the communicator transmits, at a predetermined timing set by the condition setting member, the plurality of pieces of predetermined data stored in the storage to the external device.

The gas meter of the present disclosure stores the predetermined data at predetermined intervals and collectively transmits the predetermined data to a center device, which enables the center device or the like to determine, based on the predetermined data, an occurrence of an abnormality or a cause of the abnormality.

BRIEF DESCRIPTION OF DRAWINGS

FIG. 2 is a view of set contents of a set value storing part of the first embodiment:

FIG. 5 is a view of an example of flow rate sections:

FIG. 6 is a view of a plurality of pieces of flow rate data acquired by a survey function of the second embodiment.

DESCRIPTION OF EMBODIMENTS (Knowledge and the Like on which the Present Disclosure is Based)

A gas meter has a load survey function of sequentially storing meter read values in memory at regular time intervals and collectively transmitting the meter read values to a center device or the like at a set time. This load survey function enables the gas meter to grasp a status of use in each of time zones or to present information on the usage to a user. Alternatively, the center device may be used for measures to be taken in connection with rates. Thus, to implement this function, a memory area for storing a necessary number of integrated values is allocated as a buffer.

This function can be executed as necessary but is limited to the meter read values at regular time intervals and is thus limited to grasping of the status of a usage load of a gas.

The inventors found that a plurality of pieces of specific data, which are acquirable by a gas meter and which are not necessarily the meter read values, of a predetermined time period are accumulated, and thereby, not only the status of use of the gas but also the occurrence of an abnormality and/or a cause of the occurrence of the abnormality can be analyzed, based on which the inventors accomplished the configuration of the subject matter of the present disclosure.

Embodiments will be described below in detail with reference to the drawings. Note that description which is detailed more than necessary may be omitted. For example, detailed description of already well-known matters or redundant description of substantially the same components may be omitted.

It should be noted that the enclosed drawings and subsequent description are provided in order for a skilled person to sufficiently understand the present disclosure and are not intended to limit the subject matter recited in the claims.

First Embodiment

Figure 1:
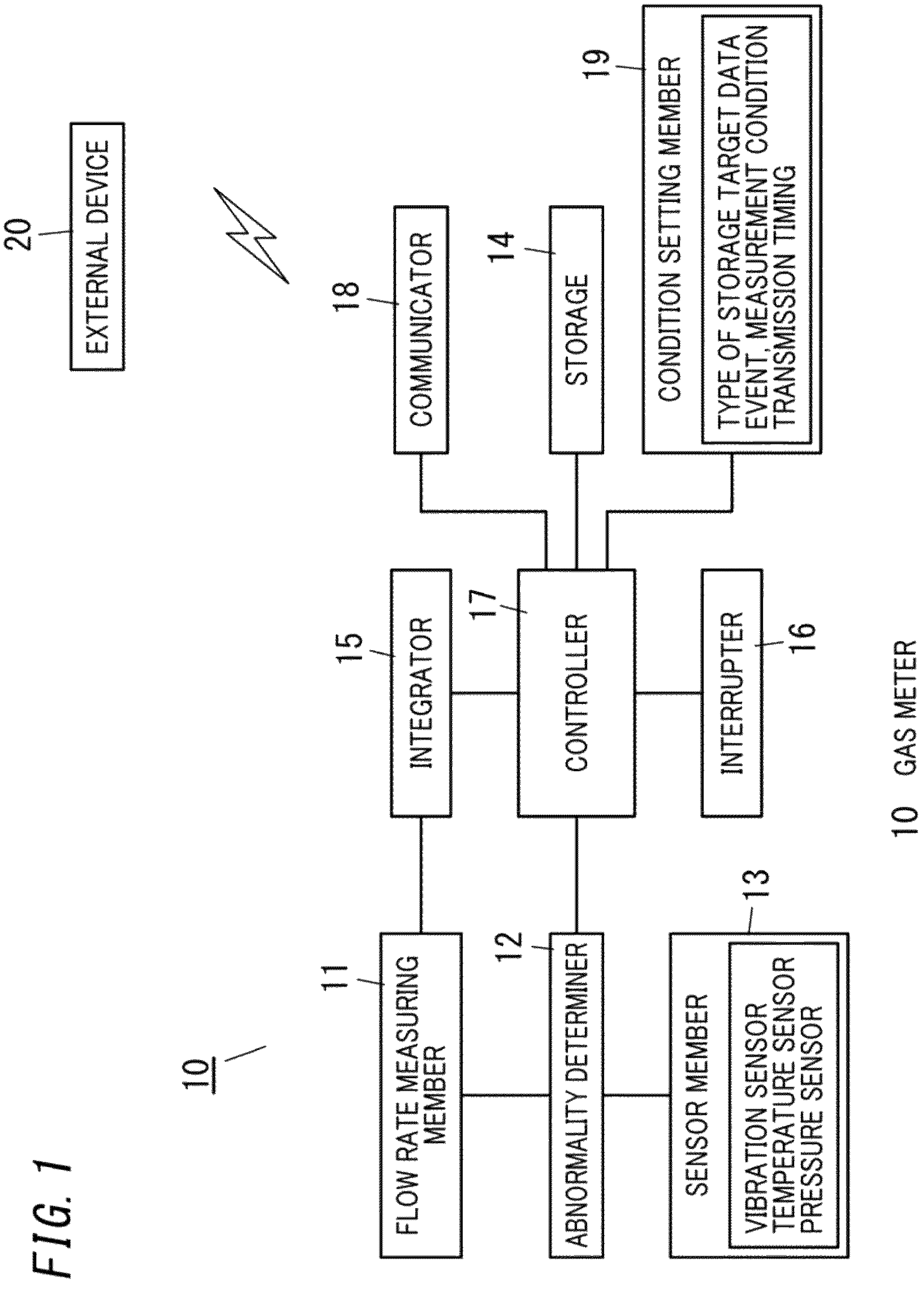
FIG. 1 is a system diagram including a gas meter of a first embodiment.
Figure 3:
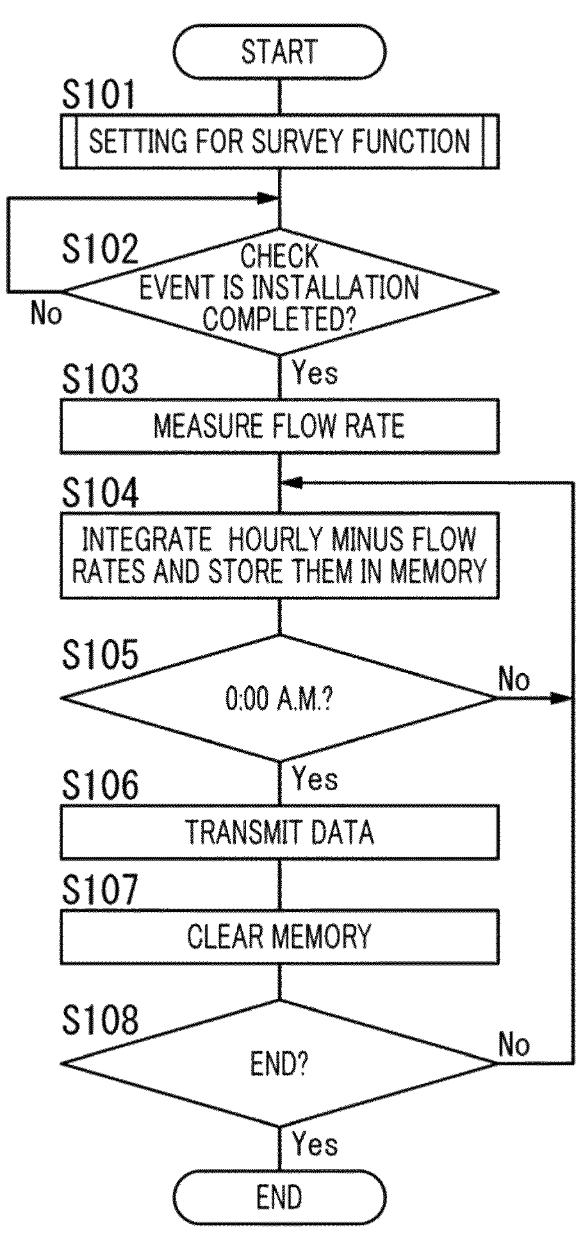
FIG. 3 is a process flowchart of a gas meter of the first embodiment.

With reference to FIGS. 1 to 3, a first embodiment will be described below.

[1-1. Configuration]

FIG. 1 is a block diagram of a configuration of a gas meter of the first embodiment. A gas meter 10 includes; a flow rate measuring member 11 configured to measure a flow rate of a gas; a sensor member 13 including a vibration sensor configured to sense an occurrence of an earthquake, a temperature sensor configured to measure a temperature of the gas and/or air temperature, a pressure sensor configured to measure pressure of the gas and/or atmospheric pressure, and the like: an abnormality determiner 12 configured to determine, based on flow rate measured by the flow rate measuring member 11 and/or a sensing result by the sensor member 13, whether or not an abnormality is present: an interrupter 16 configured to interrupt the gas as necessary depending on a determination result by the abnormality determiner 12; a communicator 18 for communicating with an external device 20 such as a center device or a setting device; a storage 14 configured to store a plurality of pieces of predetermined data; a condition setting member 19 configured to set a type of, and a storage condition for, the predetermined data to be stored in the storage 14: an integrator 15 configured to add together the flow rates measured by the flow rate measuring member 11 to calculate a meter read value; and a controller 17 configured to integrally control these members.

Note that a method for communication with the external device 20 is, for example, specified low-power radio communication, WiFi, Bluetooth (registered trademark), or the like for communication with the setting device, and cellular communication, specified low-power radio communication, a network via a relay, or the like for communication with the center device, and is not limited to a particular method.

The condition setting member 19 sets the type of the predetermined data to be stored in the storage 14, and an event in response to which storing is started, a condition, for example, a cycle of the storing, a transmission timing for transmission to the external device 20, and the like. Note that various kinds of set values set by the condition setting member 19 may be externally set by the communicator 18.

Note that in the following description, the function of acquiring the plurality of pieces of specific data of the present embodiment is referred to as a survey function.

Then, in the present embodiment, an example of the condition set by the condition setting member 19 is shown in FIG. 2.

In (a) of FIG. 2, START EVENT is a condition for starting the survey function, wherein A1: COMPLETION OF INSTALLATION means a timing at which the installation of the gas meter is completed, and a gas is started to be measured. A2: STATUS OF USE OF GAS means the start of use of the gas, the stop of use of the gas, or the gas being in use along with the use of an appliance. A3: OCCURRENCE OF EARTHQUAKE means a case where the occurrence of an earthquake is determined based on vibration detected by a vibration sensor of the sensor member 13. A4: PRESSURE DECREASE means a case where pressure sensed by the pressure sensor of the sensor member 13 decreases to a predetermined value or lower. A5: COMMUNICATION means an instruction given by the external device 20 such as the center device.

Moreover, TYPE OF DATA means a designation of data which is storage target data and which is to be stored in a buffer by the survey function, wherein B1: FLOW RATE is further classified as shown in (b) in FIG. 2, and B1-1: MINUS FLOW RATE means an integrated value of minus flow rates caused by a reverse flow: B1-2: SECTION FLOW RATE means an integrated flow rate value of flow rates corresponding to a specific flow rate section of a plurality of sections into which the flow rate zone is sectioned. Moreover, B2: TIME OF DAY means a time point at which a plurality of pieces of data are stored in the storage 14, B3: PRESSURE VALUE is pressure of the gas measured by the pressure sensor (not shown), and B4: EARTHQUAKE INTENSITY is an intensity representing the intensity of an earthquake and obtained based on vibration sensed by the sensor member 13. As the type of data, two types, for example, B2 and B4, may be designated instead of only one type, and in this case, a set of the earthquake intensity and the time of day may be stored.

Moreover, STORAGE CONDITION is a designation of a timing or a condition for storing the plurality of piece of data each of which is data designated as the storage target data in the storage 14, wherein C1: ONE-HOUR CYCLE and C2: ONE-MINUTE CYCLE mean that the storing is periodically performed respectively in one-hour cycle and in one-minute cycle. Moreover, C3: FLOW RATE VALUE means that the storing is performed, for example, when the flow rate measured by the flow rate measuring member 11 exceeds a predetermined value, and C4: DIFFERENCE VALUE means that the storing is performed when a difference value of a currently measured flow rate from a previously measured flow rate is greater than or equal to a predetermined value. Detailed conditions and the predetermined values are separately determined.

Moreover, TRANSMISSION TIMING is a timing at which the plurality of pieces of data stored in the storage 14 are collectively transmitted to the external device 20, wherein D1: ONCE A DAY (0:00 A.M.) designates the time of day, D2: TIMING AT WHICH STORAGE MEMORY IS EXCEEDED means a case where the entirety of memory allocated as the survey function has been used, D3: THE NUMBER OF PIECES OF DATA means a case where the number of pieces of stored data has reached a preset number, and D4: SPECIFIC CONDITION means a case where a preset condition has been satisfied.

In addition, as conditions for ending the survey function, for example, E1: COMMUNICATION may be set to an end instruction given by the external device 20, E2: TIME PERIOD may be set to an elapse of a preset time or period, and E3: THRESHOLD may be set to a state where obtained data has reached a threshold.

Note that FIG. 2 shows an example of conditions to be set by the condition setting member 19, and each condition may be arbitrarily set as necessary via the communicator 18.

The controller 17 stores, based on the setting conditions set by the condition setting member 19, the plurality of pieces of predetermined data in the storage 14, and transmits the plurality of pieces of predetermined data via the communicator 18 to the external device 20.

[1-2. Operation]

Next, the survey function of the gas meter 10 of the present embodiment will be described with reference to the flowchart of FIG. 3.

A survey function will be described below whose object is to determine the cause of a reverse flow when the reverse flow occurs. Note that in the present embodiment, the flow rate measuring member 11 employs ultrasonic flow metering by which an instant flow rate is measurable.

Moreover, settings for the survey function are that the start event is the completion of installation of a gas meter, the storage target data is an integrated value of the minus flow rates, the storage condition is the one-hour cycle, and the transmission timing is once a day, at 0:00 a.m.

First of all, communication with the external device 20 causes the condition setting member 19 to set the conditions, such as the plurality of pieces of data to be acquired by the survey function and an acquisition method, shown in FIG. 2 (process S101). Note that set values set by the condition setting member 19 may be stored in the gas meter in advance and may be selected by communication.

In process S102, the start event of the survey function is checked, the completion of the installation is waited, and in response to the completion of the installation, the survey function is started. Then, the flow rate measuring member 11 cyclically performs flow rate measuring (process S103). Then, in accordance with the set conditions, hourly minus flow rates of flow rates measured by the flow rate measuring member 11 are added together to obtain a piece of data, and a plurality of the pieces of data are stored in memory of the storage 14 (process S104).

Then, whether or not it is the transmission timing of the pieces of data is determined (process S105), and if the time is 0:00 a.m. which is the timing for transmission (Yes in process S105), the pieces of data stored in the storage 14 are collectively transmitted (process S106), and the memory, in which the flow rates have been stored in process S104, of the storage 14 is cleared (S107).

Thereafter, whether or not the survey function is to be ended is determined (process S108), and if the survey function is determined to be ended (Yes in process S108), the survey function is ended. If it is not the transmission timing (No in process S105), or if the survey function is determined not to be ended (No in process S108), the process proceeds to process S104, and the survey function is continued.

A plurality of pieces of flow rate data collected by the survey function above are received by the center device which is the external device 20 and are analyzed.

For example, when there are a large number of minus integrated values immediately from the completion of the installation of the gas meter 10, it is inferable that the cause of the reverse flow is highly possibly an environmental factor. That is, it is determined that a gas appliance (e.g., a gas heat pump) connected to a pipeline upstream of the gas meter 10 causes the reverse flow: Moreover, this survey function continuously acquires a plurality of pieces of data, and if the number of minus integrated values suddenly increases from a certain timing, it is determined that an environment is changed or the measurement by the gas meter possibly involves an abnormality. As a change in the environment, for example, an installation of a gas heat pump can be grasped by a gas business operator, and therefore, if the change in the environment is not the cause of the reverse flow; the cause of the reverse flow may inferably be an abnormality in the measurement by the gas meter, and the gas meter may be repaired or replaced.

Thus, using the survey function of the present embodiment enables the cause of an abnormality resulting from the occurrence of a reverse flow to be determined or inferred.

Note that in the above description, the start event is the completion of installation of the gas meter, but the survey function may be started in response to the occurrence of the reverse flow; that is, the measurement of a minus flow rate by the flow rate measuring member or may be started periodically (e.g., once every three months). Moreover, the transmission timing may be set to several days, and a plurality of pieces of data of the several days may collectively be analyzed.

[1-3. Effect, Etc.]

As described above, the present embodiment includes the flow rate measuring member 11 configured to measure a flow rate of a gas, the storage 14 configured to store a plurality of pieces of predetermined data, except for a meter read value, of a plurality of pieces of flow rate data each of which is calculated based on the flow rate measured by the flow rate measuring member 11, the condition setting member 19 configured to set a type of, and a storage condition for, the predetermined data to be stored in the storage 14, and the communicator 18 for transmission of the plurality of pieces of predetermined data stored in the storage 14 to the external device 20, the storage 14 is configured to sequentially store an integrated value of a minus flow rate as a piece of predetermined data every one hour after the completion of the installation as the predetermined event, and the communicator 18 transmits, once a day as the predetermined timing, the plurality of pieces of data stored in the storage 14 to the center device which is the external device 20, which enables the center device to determine the cause of the occurrence of the reverse flow from the situation of the occurrence of the minus flow rates.

Second Embodiment

[2-1. Configuration]

A configuration of a gas meter of a second embodiment of the present disclosure is similar to that of the first embodiment, and the description thereof is omitted.

[2-2. Operation]

Figure 4:
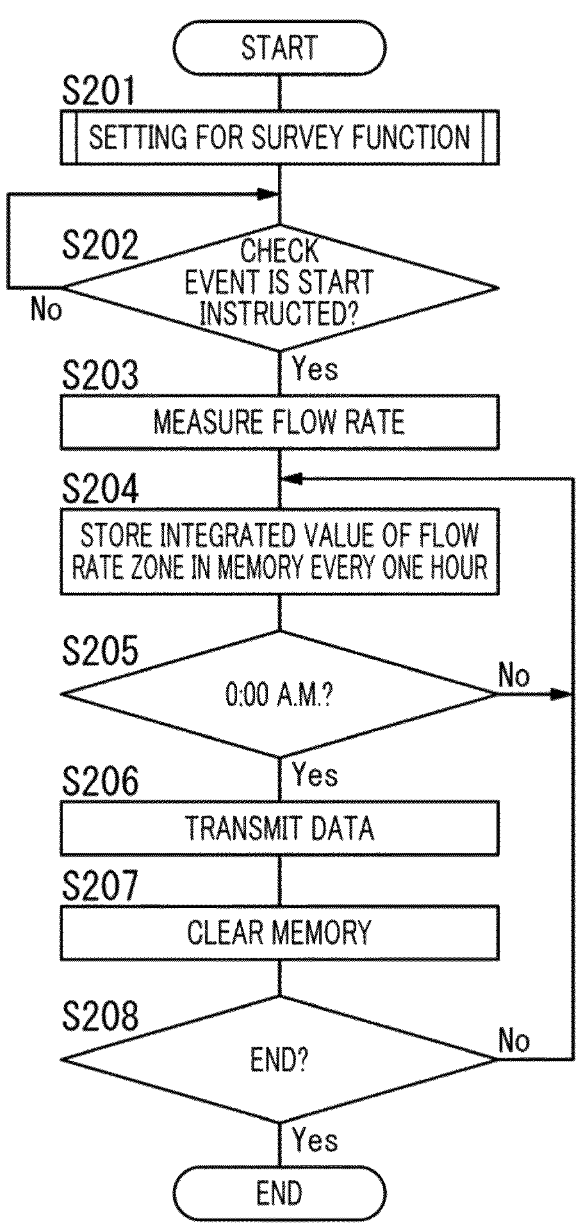
FIG. 4 is a process flowchart of a gas meter of a second embodiment.

Next, with reference the flowchart of FIG. 4, operation of a gas meter 10 of the present embodiment will be described.

An object of a survey function in the present embodiment is to grasp a status of use of a gas appliance, and settings for the survey function are that the start event is communication, the storage target data is an integrated value of two flow rate zones which are sections 2 to 3 and sections 10 to 13 of flow rate sections, the storage condition is the one-hour cycle, and the transmission timing is once a day, at 0:00 a.m. Here, the flow rate sections are sections into which the flow rate of a gas is sectioned in terms of a flow rate range, and for each flow rate section, a continuous use time is set. FIG. 5 shows an example of the relationship between the flow rate section and the gas flow rate and the continuous use time set for each flow rate section.

First of all, communication with the external device 20 causes the condition setting member 19 to set the conditions, such as a plurality of pieces of data to be acquired by the survey function and an acquisition method, shown in FIG. 2 (process S201). Note that set values set by the condition setting member 19 may be stored in the gas meter in advance and may be selected by communication.

In process S202, the start event of the survey function is checked, a start instruction given in the communication is waited, and in response to reception of the start instruction, the survey function is started. Then, the flow rate measuring member 11 cyclically performs flow rate measuring (process S203). Then, in accordance with the set conditions, flow rates measured by the flow rate measuring member 11 are added together for each of the two flow rate sections (sections 2 to 3 and sections 10 to 13) every one hour to obtain a piece of data, and a plurality of the pieces of data are stored in memory of a storage 14 (process S204).

Then, whether or not it is the transmission timing of the pieces of data is determined (process S205), and if the time is 0:00 a.m. which is the timing for transmission (Yes in process S205), the pieces of data stored in the storage 14 in process S204 are collectively transmitted (process S206), and the memory of the storage 14 is cleared (S207).

Thereafter, whether or not the survey function is to be ended is determined (process S208), and if the survey function is determined to be ended (Yes in process S208), the survey function is ended. If it is not the transmission timing (No in process S205), or if the survey function is determined not to be ended (No in process S208), the process proceeds to process S204, and the survey function is continued.

A plurality of pieces of flow rate data collected by the survey function above are received by the center device which is the external device 20 and are analyzed.

FIG. 6 is a view showing the plurality of pieces of flow rate data acquired by the center device by the survey function and shows a state where the integrated value (L) of the two flow rate zones (sections 2 to 3 and sections 10 to 13) is stored as gas consumption (L) for each of time zones in one day. In FIG. 6. TIME ZONE shows zones into which one day is sectioned hourly, wherein TIME ZONE 0 means from 0:00 a.m. to 1:00 a.m., TIME ZONE 1 means from 1:00 a.m. to 2:00 a.m., and so on. Moreover, in FIG. 6, ESTIMATED USED APPLIANCE is a gas appliance which corresponds to the flow rate for each time zone and which is estimated from gas appliances connected downstream of the gas meter 10 and the flow rates of the gas appliances.

Therefore, as long as a gas business operator grasps a living rhythm (going to bed at night) of, and gas appliances (a stove, a hot water dispenser, and a dryer) used by, a consumer, the gas business operator can know that the dryer is used at midnight from the status of use of the gas shown in this figure. Thus, as a method for applying a discount regarding the gas usage by the dryer, the gas business operator can take measures for a discount targeting the gas consumption in sections 2 to 3 at midnight (time zones 1 to 3 in FIG. 6).

[2-3. Effects, Etc.]

As described above, the present embodiment includes the flow rate measuring member 11 configured to measure a flow rate of a gas, the storage 14 configured to store a plurality of pieces of predetermined data, except for a meter read value, of a plurality of pieces of flow rate data each of which is calculated based on the flow rate measured by the flow rate measuring member 11, the condition setting member 19 configured to set a type of, and a storage condition for, the predetermined data to be stored in the storage 14, the communicator 18 for transmission of the plurality of pieces of predetermined data stored in the storage 14 to the external device 20, the storage 14 starts, in response to the start instruction as a predetermined event given in communication, sequentially storing an integrated flow rate in a flow rate zone designated as a piece of predetermined data every one hour, and the communicator 18 transmits, once a day as the predetermined timing, the plurality of pieces of predetermined data stored in the storage 14 to the center device which is the external device 20, which enables the center device to estimate the status of use of a specific gas appliance, and a measure such as rate discount service can be taken.

Third Embodiment

[3-1. Configuration]

A configuration of a gas meter 10 in a third embodiment of the present disclosure is similar to that in the first embodiment, and the description thereof is omitted.

[3-2. Operation]

Figure 7:
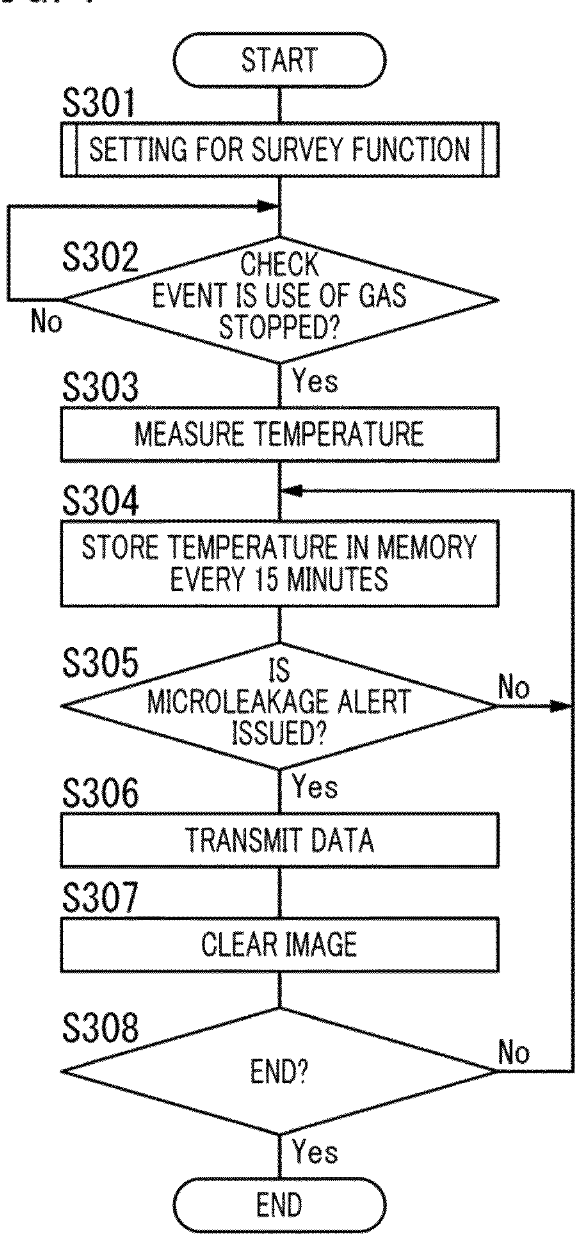
FIG. 7 is a process flowchart of a gas meter of a third embodiment.

Next, with reference to the flowchart of FIG. 7, operation of the gas meter 10 of the present embodiment will be described.

An object of a survey function in the present embodiment is to determine whether or not an alert given by a pressure-type microleakage alert function of the gas meter 10 is an error alert, and settings for the survey function are that the survey function is started immediately after the use of a gas is stopped, the storage target data is temperature data, the storage condition is every 15 minutes, and the transmission timing is an issuance of a pressure-type microleakage alert.

Note that the pressure-type microleakage alert function of the gas meter 10 is a function of getting a difference between pressure immediately after stopping the use of the gas and pressure of every 15 minutes after the stopping and issuing an alert due to the possibility of the occurrence of microleakage of the gas in a gas supply pipeline if no gas pressure rise of greater than 0.2 kPa is observed for 30 days.

This function, however, uses variations in the pressure of the gas due to a change in air temperature, and therefore, for example, when the gas meter is installed in a place where the air temperature does not change much, no pressure rise occurs, and thus, this function may erroneously determine that a leakage occurs. Therefore, in the present embodiment, the survey function is used to determine whether or not the alert is erroneous, and based on a determination result, a gas business operator can make an appropriate determination.

First of all, communication with an external device 20 causes a condition setting member 19 to set conditions, such as a plurality of pieces of data to be acquired by the survey function and an acquisition method, shown in FIG. 2 (process S301). Note that set values set by the condition setting member 19 may be stored in the gas meter in advance and may be selected by communication.

In process S302, the start event of the survey function is checked and the stop of use of the gas, that is, measurement of a zero flow rate by a flow rate measuring member 11 is waited, and in response to the stop of the use of the gas, the survey function is started. Note that the pressure-type microleakage alert function is assumed to operate independently of the survey function.

Then, a temperature sensor of a sensor member 13 measures the temperature of the gas (process S303). Then, in accordance with the set conditions, a piece of temperature data is stored in memory of a storage 14 every 15 minutes (process S304). Thereafter, whether or not it is a transmission timing of a plurality of pieces of data is determined based on whether or not an microleakage alert is issued (process S305), and if the microleakage alert is issued (Yes in process S305), the plurality of pieces of data stored in the storage 14 in process S304 is collectively transmitted (process S306), and the memory of the storage 14 is cleared (S307).

Thereafter, whether or not the survey function is to be ended is determined (process S308), and if the survey function is determined to be ended (Yes in process S308), the survey function is ended. If no microleakage alert is issued (No in process S305), or if the survey function is determined not to be ended (No in process S308), the process proceeds to process S304, and the survey function is continued.

A plurality of pieces of temperature data collected by the survey function above are received by the center device which is the external device 20 and are analyzed.

The center device analyzes the plurality of pieces of temperature data acquired by the survey function, and if a predetermined temperature rise is not observed for past 30 days, it can be determined that the microleakage alert of the gas meter 10 is possibly an error alert, and the gas business operator can take an appropriate measure.

Note that in the present embodiment, the plurality of pieces of temperature data are stored in the storage 14 immediately from the stop of the use of the gas but may be constantly stored. Moreover, the piece of temperature data itself is stored every 15 minutes, but only a maximum value of differences between each of temperatures each measured every one hour and an initial value (temperature after the stop of the use of the gas) may be stored every one hour.

Moreover, until the microleakage alert is issued, storing the plurality of pieces of temperature data of 30 days in the storage 14 requires a huge amount of memory, and therefore, transmitting the plurality of pieces of temperature data once a day or, each time a count of 30 days by the microleakage alert function is counted up, can reduce required memory. In any case, it is needless to say that it suffices that temperatures of past 30 days can be checked when an microleakage alert is issued.

Note that in the present embodiment, an application example by acquisition of temperature data by the temperature sensor has been described, but data, such as pressure measured by a pressure sensor or an earthquake intensity measured by a vibration sensor, as necessary may be acquired by the survey function and may be used for various analysis.

For example, measuring pressure only for a predetermined time period after the occurrence of an earthquake is sensed by a vibration sensor also enables applications such as sensing a gradually developing abnormality in a pipeline as a result of the earthquake.

[3-3. Effects, Etc.]

As described above, the present embodiment includes the flow rate measuring member 11 configured to measure a flow rate of a gas, the sensor member 13 including a sensor configured to measure at least one of vibration, temperature, or pressure, the storage 14 configured to store a plurality of pieces of predetermined data of a plurality of pieces of data measured by the sensor member 13, the condition setting member 19 configured to set a type of, and a storage condition for, the predetermined data to be stored in the storage 14, and the communicator 18 for transmission of the plurality of pieces of predetermined data stored in the storage 14 to the external device 20, the storage 14 starts sequentially storing temperatures which are the plurality of pieces of the predetermined data in response to the stop of use of the gas as the predetermined event, and the communicator 18 transmits the plurality of pieces of data stored in the storage 14 to the external device 20 in response to a determination, as a predetermined timing, that a microleakage alert is issued, which enables the center device to determine whether or not the microleakage alert is erroneously determined by checking a temperature during a sensing time period for the microleakage alert.

Note that the embodiment described above is to exemplify a technology in the present disclosure, and therefore, various changes, replacements, additions, omissions, etc. that fall within the scope of the claims or the range of equivalency of the claims may be made to embodiment described above.

INDUSTRIAL APPLICABILITY

As described above, according to the gas meter of the present disclosure, the function of load survey is not limited to collection of meter read values but is applicable to collection of wide range of data, thereby enabling the center device to perform various analyses.

REFERENCE SIGNS LIST

10 Gas Meter
11 Flow Rate Measuring Member
12 Abnormality Determiner
13 Sensor Member
14 Storage
15 Integrator
16 Interrupter
17 Controller
18 Communicator
19 Condition Setting Member
20 External Device

The invention claimed is:

1. A gas meter comprising:

a flow rate measuring member configured to measure a flow rate of a gas;

a sensor member including a sensor configured to measure at least one of vibration, temperature, or pressure;

a storage configured to store a plurality of pieces of predetermined data of a plurality of pieces of data measured by the sensor member;

a condition setting member; and a communicator configured to transmit the plurality of pieces of predetermined data stored in the storage to an external device, the storage starting sequentially storing the plurality of pieces of predetermined data in response to an occurrence of a predetermined event set by the condition setting member, the communicator transmitting, at a predetermined timing set by the condition setting member, the plurality of pieces of predetermined data stored in the storage to the external device, the condition setting member being configured to set, for each of a plurality of events in response to which storing of the plurality of pieces of predetermined data is started, a type of the plurality of pieces of predetermined data to be stored in the storage, a cycle of storing the plurality of pieces of predetermined data in the storage, a condition for ending storing the plurality of pieces of predetermined data in the storage, and a transmission timing for transmission of the plurality of pieces of predetermined data stored in the storage to the external device.

* * * * *